(12) United States Patent
Gong et al.

(10) Patent No.: US 10,845,981 B2
(45) Date of Patent: Nov. 24, 2020

(54) OPERATION CONTROL METHOD, DEVICE AND STORAGE MEDIUM

(71) Applicant: Tencent Technology (Shenzhen) Company Limited, Shenzhen (CN)

(72) Inventors: Tao Gong, Shenzhen (CN); Yuanchao Huang, Shenzhen (CN); Hai Long, Shenzhen (CN); Jing Kou, Shenzhen (CN); Yixuan Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/433,914

(22) Filed: Jun. 6, 2019

(65) Prior Publication Data
US 2019/0310753 A1    Oct. 10, 2019

Related U.S. Application Data

(63) Continuation of application No. PCT/CN2018/080205, filed on Mar. 23, 2018.

(30) Foreign Application Priority Data

Mar. 28, 2017  (CN) .......................... 2017 1 0193663

(51) Int. Cl.
*G06F 3/0487*    (2013.01)
*G06F 3/0489*    (2013.01)
(Continued)

(52) U.S. Cl.
CPC ............ *G06F 3/0487* (2013.01); *A63F 13/23* (2014.09); *A63F 13/426* (2014.09);
(Continued)

(58) Field of Classification Search
CPC .... G06F 3/0487; G06F 3/0486; G06F 3/0238; G06F 3/03543; G06F 3/04817;
(Continued)

(56) References Cited

U.S. PATENT DOCUMENTS 10,403,050 B1 * 9/2019 Beall .................... G02B 27/017
2012/0026408 A1   2/2012 Lee et al.
(Continued)

FOREIGN PATENT DOCUMENTS

CN       1801080 A       7/2006
CN     103886198 A       6/2014
(Continued)

OTHER PUBLICATIONS

Tencent Technology, WO, PCT/CN2018/080205, Jun. 28, 2018, 5 pgs.
(Continued)

*Primary Examiner* — Andrew Sasinowski
(74) *Attorney, Agent, or Firm* — Morgan, Lewis & Bockius LLP

(57) ABSTRACT

Embodiments of the present application disclose an operation control method performed by a terminal. The method includes: obtaining effective key information in response to a triggering operation for a specific key on a corresponding keyboard; obtaining a target object attribute according to the effective key information; determining a first specified area according to a first display position and a second display position when obtaining a release operation for the specific key; and controlling an operation object to release the target object attribute in the first specified area.

20 Claims, 10 Drawing Sheets

(51) Int. Cl.
- *G06F 3/0481* (2013.01)
- *G06F 3/0484* (2013.01)
- *G06F 3/023* (2006.01)
- *G06F 3/0354* (2013.01)
- *A63F 13/23* (2014.01)
- *A63F 13/533* (2014.01)
- *A63F 13/426* (2014.01)
- *G06F 3/0486* (2013.01)
- *A63F 13/22* (2014.01)

(52) U.S. Cl.
CPC .......... *A63F 13/533* (2014.09); *G06F 3/0238* (2013.01); *G06F 3/03543* (2013.01); *G06F 3/0486* (2013.01); *G06F 3/04817* (2013.01); *G06F 3/04845* (2013.01); *G06F 3/04897* (2013.01); *A63F 13/22* (2014.09); *A63F 2300/1018* (2013.01); *A63F 2300/1025* (2013.01)

(58) Field of Classification Search
CPC ............. G06F 3/04845; G06F 3/04897; G06F 3/04812; G06F 3/023; G06F 2203/03; A63F 13/23; A63F 13/426; A63F 13/533; A63F 13/22; A63F 2300/1018; A63F 2300/1025; A63F 13/42
See application file for complete search history.

(56) References Cited

U.S. PATENT DOCUMENTS

| | | | |
|---|---|---|---|
| 2012/0235912 A1* | 9/2012 | Laubach | G06F 3/04812 345/163 |
| 2013/0019208 A1* | 1/2013 | Kotler | G06F 3/04812 715/835 |
| 2014/0274410 A1 | 9/2014 | Maynard et al. | |
| 2016/0034166 A1* | 2/2016 | Wilson | G06F 9/451 715/771 |
| 2016/0062598 A1* | 3/2016 | Kocienda | G06F 3/04817 715/765 |

FOREIGN PATENT DOCUMENTS

| | | |
|---|---|---|
| CN | 104922906 A | 9/2015 |
| CN | 104965655 A | 10/2015 |
| CN | 105117579 A | 12/2015 |
| CN | 106201265 A | 12/2016 |
| CN | 107066173 A | 8/2017 |

OTHER PUBLICATIONS

Tencent Technology, IPRP, PCT/CN2018/080205, Oct. 10, 2019, 6 pgs.

Tencent Technology, ISR, PCT/CN2018/080205, dated Jun. 28, 2018, 2 pgs.

* cited by examiner

OPERATION CONTROL METHOD, DEVICE AND STORAGE MEDIUM

CROSS-REFERENCE TO RELATED APPLICATIONS

This application is a continuation application of PCT/CN2018/080205, entitled "OPERATION CONTROL METHOD AND APPARATUS, AND STORAGE MEDIUM" filed on Mar. 23, 2018, which claims priority to Chinese Patent Application No. 201710193663.3, entitled "OPERATION CONTROL METHOD AND APPARATUS" and filed with the China National Intellectual Property Administration on Mar. 28, 2017, all of which are incorporated by reference in their entirety.

FIELD OF THE TECHNOLOGY

Embodiments of the present application relate to the field of terminal technologies, and in particular, to an operation control method and apparatus, and a storage medium.

BACKGROUND OF THE DISCLOSURE

In modern life, to relieve the working pressure, many users enjoy playing games on terminals. Because operation control manners of gaming applications directly affect gaming experience of users, how to perform operation control on the gaming applications becomes a problem concerned by a person skilled in the art.

SUMMARY

A first aspect of the present application provides an operation control method performed at a terminal having one or more processors and memory storing a plurality of programs to be executed by the one or more processors, the method comprising:

displaying an operation interface of a specific application, a first display position of an operation object and a second display position of a corresponding mouse being displayed on the operation interface;

obtaining a key instruction in response to a triggering operation for a specific key on a corresponding keyboard, the key instruction including effective key information;

obtaining a target object attribute from object attributes of the operation object according to the effective key information;

obtaining a release instruction for the target object in response to a release operation for the specific key;

determining a first specified area according to the first display position and the second display position in response to the release instruction; and controlling the operation object to release the target object attribute in the first specified area.

A second aspect of the present application further provides a terminal comprising memory and a processor, the memory storing computer readable instructions that, when executed by the processor, cause the terminal to perform the aforementioned operation control method.

A third aspect of this application further provides a non-transitory computer readable storage medium storing a plurality of machine readable instructions in connection with a terminal having one or more processors, wherein the plurality of machine readable instructions, when executed by the one or more processors, cause the terminal to perform the aforementioned operation control method.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
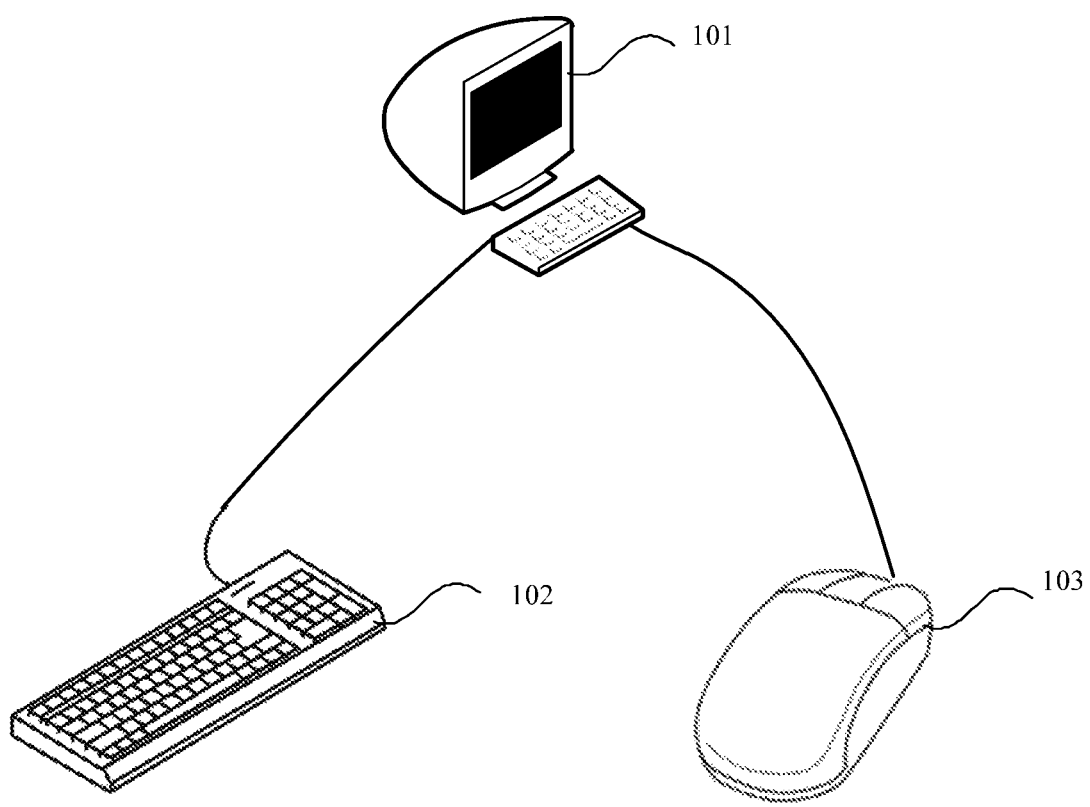
FIG. 1 is a schematic diagram of an implementation environment in an operation control method according to an embodiment of this application.

To make objectives, technical solutions, and advantages of this application clearer, the following further describes in detail implementations of this application with reference to the accompanying drawings.

Before detailed description is provided, concepts in the embodiments of the present application are first explained below.

An operation object is an object that needs to be controlled by a terminal in a running process of a specific application. The specific application may be a gaming application. An operating system compatible with the specific application may be an Android operating system, an IOS operating system, or the like. When the specific application is a gaming application, the operation object may be a virtual character, a virtual animal, or the like in the gaming application.

An object attribute is an attribute owned by the operation object in the specific application. When the specific application is a gaming application, the object attribute is a skill owned by the operation object, including attacking, healing, defense, or the like.

An attribute icon is an icon that carries the object attribute on an operation interface. When the specific application is a gaming application, the attribute icon may be a skill wheel in a game.

A moving icon is an icon that controls the operation object to move on the operation interface. When the specific application is a gaming application, the moving icon may be a moving wheel in a game.

A release range is an actual function range of the object attribute. When the specific application is a gaming application, the release range is a skill range.

A moving range is a dragging range of the attribute icon.

Currently, for a specific application, control on an operation object mainly includes the following two aspects: In one aspect, the control is control on movement of the operation object, and in the other aspect, the control is control on release of an object attribute of the operation object. For the first aspect, the existing technology is mainly implemented based on four keys, namely, AWDS, on a keyboard and combination keys of the four keys. The key W is used for controlling the operation object to move upward, the key A is used for controlling the operation object to move to the left, the key D is used for controlling the operation object to move to the right, and the key S is used for controlling the operation object to move downward. The keys A+W are used for controlling the operation object to move to the upper left, the keys A+S are used for controlling the operation object to move to the lower left, the keys D+W are used for controlling the operation object to move to the upper right, and the keys D+S are used for controlling the operation object to move to the lower right. An existing operation control process includes: receiving a key message sent by the keyboard, the key message including information about a triggered key; determining a control direction of the operation object according to the information about the triggered key; and controlling the operation object to move according to the control direction. However, limited by the keys on the keyboard and combinations of the keys, in the existing technology, when control on movement of the operation object is performed, control in only eight directions, namely, up, down, left, right, upper left, lower left, upper right, and lower right can be implemented. However, in an actual control operation process, a moving direction of the operation object may be 360 degrees. As can be seen, in the existing operation control method, the moving direction of the operation object is controlled in an undiversified manner. However, in this application, movement of the operation object is controlled according to a clicking position of a mouse and a position of the operation object, thereby expanding the moving direction of the operation object.

For the second aspect, an existing operation control process includes: in a running process of a gaming application, receiving a clicking instruction sent by a paired and connected mouse, the clicking instruction including a clicking position; determining whether the clicking position is located at a central position of the attribute icon; if the clicking position is located at the central position of the attribute icon and a dragging instruction sent by the mouse is received, performing a dragging operation on any attribute icon according to the dragging instruction; in a dragging process of the attribute icon, if a display instruction sent by the mouse is received, controlling the operation object to display an object attribute corresponding to the attribute icon by using a current position as a start point and a direction parallel to a dragging track direction as a display direction. Because a user needs to use the mouse to click the central position of the attribute icon and needs to drag the attribute icon, leading to a relatively complex operation process. However, in this application, release of the object attribute of the operation object is controlled according to a display position of the mouse and effective key information of the keyboard, thereby not only reducing operation complexity, but also improving release precision.

FIG. 1 shows an implementation environment in an operation control method according to an embodiment of this application. Referring to FIG. 1, the implementation environment includes a terminal 101, a keyboard 102, and a mouse 103.

The terminal 101 may be a device such as a notebook computer or a desktop computer. An operating system simulator is installed in the terminal 101. The operating system simulator can simulate a running environment of a specific application in the terminal 101, so that the terminal can smoothly run the specific application.

The keyboard 102 is one of a wired keyboard and a wireless keyboard, and is configured to input key information to the terminal 101.

The mouse 103 is one of a wired mouse and a wireless mouse, and is configured to send a control instruction to the terminal 102.

The terminal 101 is further corresponding to the keyboard 102 and the mouse 103, so that in a running process of the specific application, the terminal 101 may obtain an operation instruction by using the keyboard 102 and the mouse 103. A connection manner between the terminal 101 and the keyboard 102 as well as the mouse 103 includes but is not limited to one of a wired connection manner and a wireless connection manner.

Figure 2:
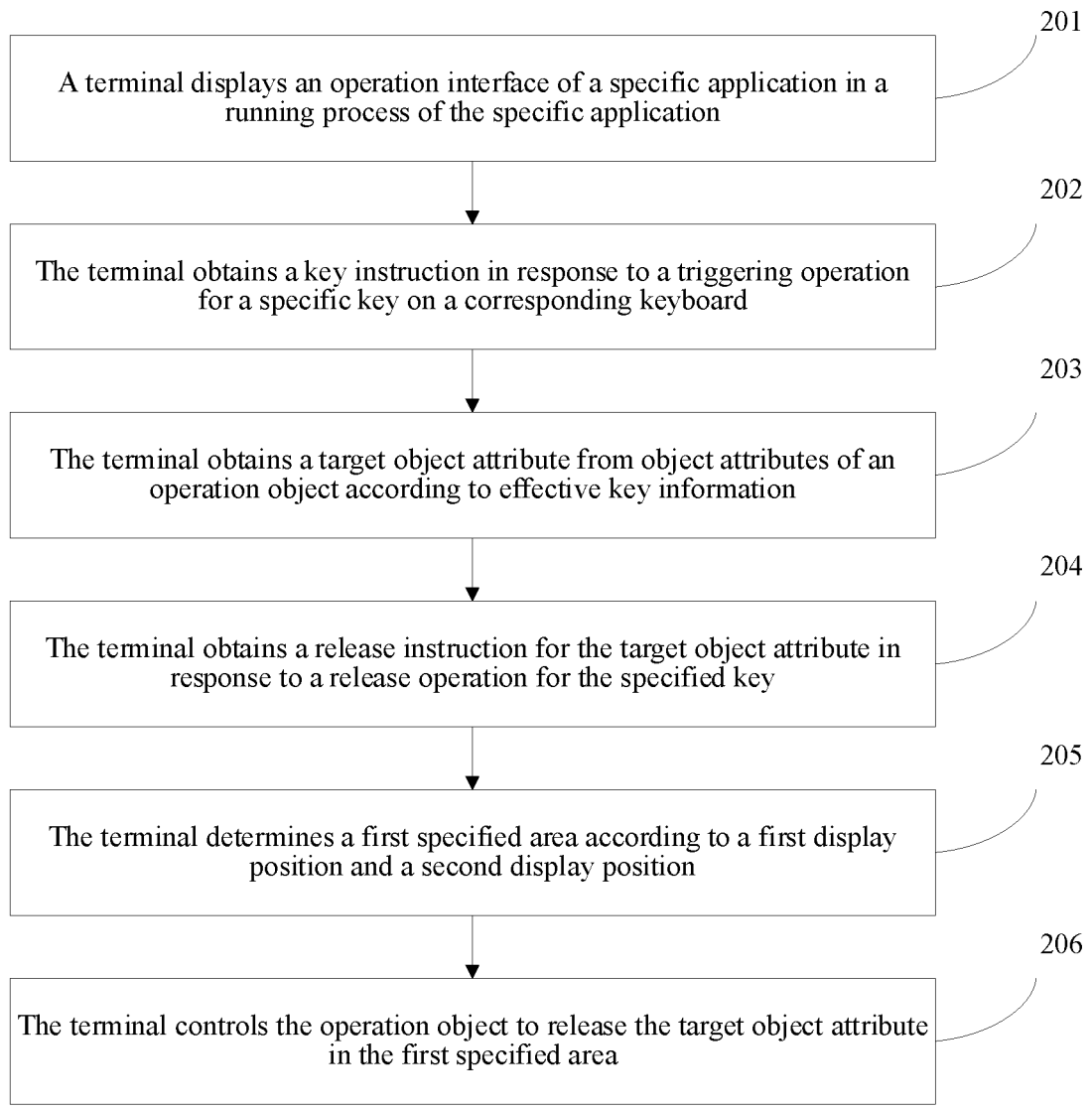
FIG. 2 is a flowchart of an operation control method according to an embodiment of this application.

An embodiment of the present application provides an operation control method, applied to an operation control apparatus. Referring to FIG. 2, a method process provided in this embodiment of the present application includes the following steps.

201: A terminal displays an operation interface of a specific application in a running process of the specific application.

A first display position of an operation object and a second display position of a corresponding mouse are displayed on the operation interface. The operation object is an object managed by a user account for logging in to the specific application. The operation object has at least one object attribute, for example, an operation performed by the operation object, for example, attacking, defense, or healing. For the mouse, the second display position is actually a position of a cursor.

202: The terminal obtains a key instruction in response to a triggering operation for a specific key on a corresponding keyboard.

In this embodiment of the present application, the terminal may obtain the key instruction in response to the triggering operation for the specific key on the corresponding keyboard, the key instruction including effective key information. The specific key may be defined by a user in advance. The effective key information includes an identifier of a triggered key, triggering duration of the triggered key, and the like.

203: The terminal obtains a target object attribute from object attributes of an operation object according to effective key information.

The terminal obtains the target object attribute from at least one object attribute of the operation object according to the effective key information in a manner which includes but is not limited to the following several manners.

In an embodiment of this application, the terminal may maintain an object database. The object database stores a correspondence between a key identifier and an object attribute, and further stores a release range of each object attribute and the like. Based on the object database, the terminal may obtain the target object attribute from the at least one object attribute of the operation object. For example, an object attribute corresponding to a key identifier Q in the object database is used for representing an attribute of an attacking function, and an object attribute corresponding to a key identifier W is used for representing a healing function. If a key identifier in the effective key information is Q, the target object attribute can be obtained to be used for representing the attacking function.

In another embodiment of this application, the terminal may set different values for all key identifiers in advance, and set different values for all object attributes of the operation object. When obtaining the effective key information, the terminal may obtain a value of a key identifier from the effective key information, and compare the value of the key identifier with the values of all the object attributes of the operation object. When the value of the key identifier is the same as a value of any object attribute of the operation object, the object attribute is used as the target object attribute.

In some examples, the object attribute is an encapsulated function. When the function is called and executed, the operation object may be enabled to perform a corresponding action. The target object attribute is an object attribute corresponding to the specific key. The obtaining a target object attribute includes: determining an object attribute corresponding to the specific key, using the object attribute as the target object attribute, and granting the operation object a permission for calling a function corresponding to the target object attribute.

204: The terminal obtains a release instruction for the target object in response to a release operation for the specific key.

When obtaining the release operation for the specific key, the terminal obtains the release instruction for the target object attribute after triggered by the release operation. The release instruction is used for controlling the operation object to release the target object attribute in a specified area.

205: The terminal determines a specified area according to a first display position and a second display position in response to the release instruction.

When determining the specified area according to the first display position and the second display position, the terminal may use a stripe area that uses the first display position as a start point and the second display position as an end point as the specified area, or may use a fan-shaped area that uses the first display position as a start point and that includes the first display position and the second display position as the specified area. Certainly, the terminal may determine the specified area in another manner, and this is not specifically limited in this embodiment of the present application.

206: The terminal controls the operation object to release the target object attribute in the specified area.

Because a processor has response duration, to enable the terminal to identify an operation that needs to be performed, in response to the release instruction, the terminal may wait for first preset duration, and when duration for obtaining the release instruction reaches the first preset duration, the terminal controls the operation object to release the target object attribute in the specified area. The first preset duration is determined by a response capability of the processor, and the first preset duration may be 50 milliseconds, 60 milliseconds, or the like. Herein, the release instruction refers to an operation that the user releases the specific key. The releasing the target object attribute means responding to the release instruction and calling the function corresponding to the target object attribute, to control the operation object to perform an action corresponding to the target object attribute.

In some embodiments, the terminal may further display a releaser of the target object attribute in the specified area in response to a release operation for the operation object.

To intuitively show to the user whether the target object attribute is released, in the method provided in this embodiment of the present application, when the release operation for the operation object is obtained, the releaser of the target object attribute is further displayed in the specified area. The releaser is configured to indicate whether the target object attribute is released and the releaser has an indication direction. The indication direction is the same as a release direction of the target object attribute. For the operation object, display attributes (including display shapes, display colors, and the like) of releasers of different object attributes on the operation interface may be the same or may be different.

Figure 3:
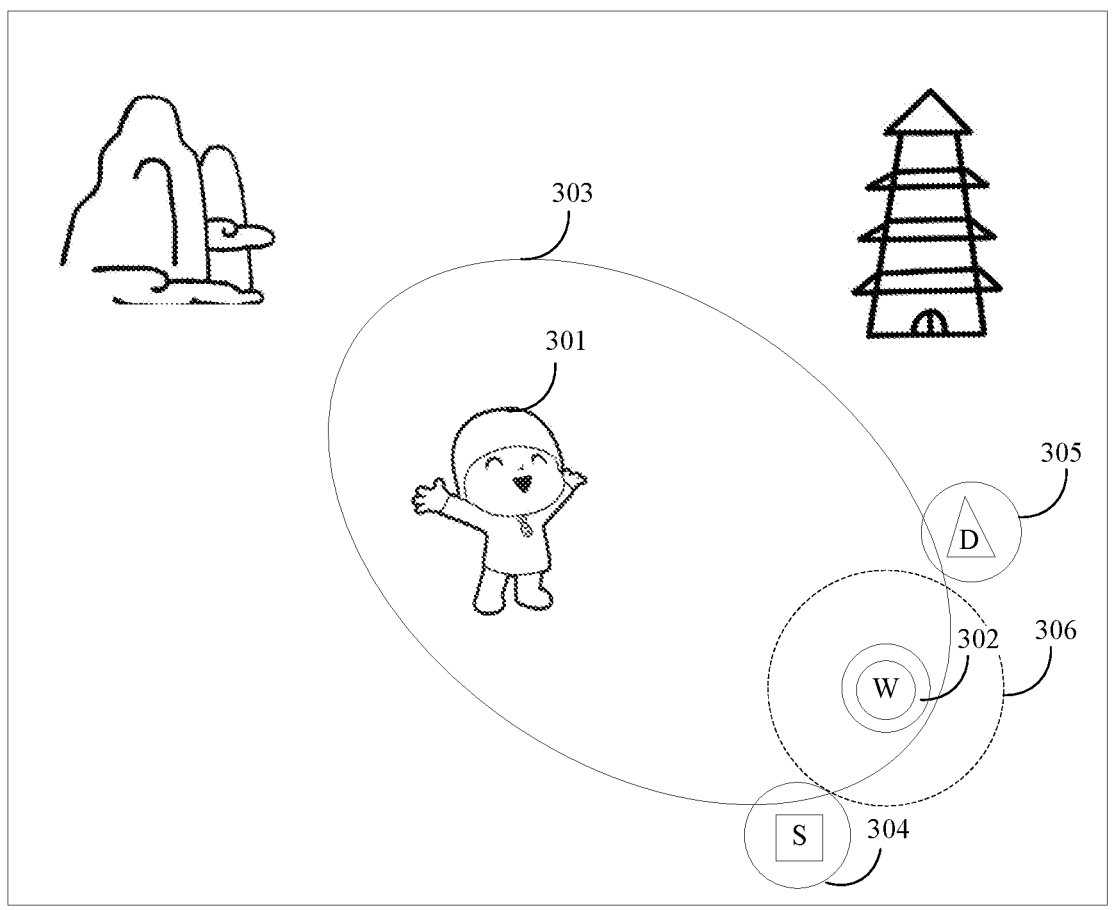
FIG. 3 is a schematic diagram of an operation interface according to another embodiment of this application.

In this embodiment of the present application, each object attribute of the operation object has a release range. Each object attribute of the operation object may be released only inside a corresponding release range and cannot be released outside the release range. A size of the release range is determined by the operation object, and display ranges of different operation objects are different. Usually, a shape of the release range is a circle. However, the specific application generally performs displaying in a 3D display manner with an oblique angle. Therefore, in an actual operation process, the shape of the release range is an ellipse. FIG. 3 shows an operation interface of a gaming application. As can be learned from FIG. 3, a release range of an object attribute W of an operation object 301 is an ellipse, and the release range of the object attribute W is an elliptical area 303 in FIG. 3.

To facilitate the user in controlling the operation object by using the mouse and the keyboard, the terminal further displays an object icon that carries an object attribute on the operation interface of the specific application. Each object icon has a moving range. A shape of the moving range is generally a circle, and moving ranges of object icons of a same operation object are the same. In an actual operation process, each object icon can be dragged only inside the moving range and cannot be dragged outside the moving range. FIG. 3 shows the operation interface of the gaming application. As can be learned from FIG. 3, object icons displayed on the operation interface include an icon 302 used for representing a skill wheel W, an icon 304 used for representing a skill wheel S, and an icon 305 used for representing a skill wheel D. Using the icon 302 used for representing the skill wheel W as an example, a moving range of the skill wheel W is a circular area 306 in a dotted line.

Based on functions of the release range and the moving range, in a running process of the specific application, to provide operation guidance for the user, in the method provided in this embodiment of the present application, a release range of the target object attribute and a moving range of the target object icon are further displayed on the operation interface. Based on the release range of the target object attribute and the moving range of the target object icon displayed on the operation interface, in the method provided in this embodiment of the present application, when the release instruction is obtained, a first mapping position of the second display position in the moving range is further determined according to the second display position, the release range of the target object attribute, and the moving range of the target object icon. When the operation object is controlled to release the target object attribute in the specified area, the target object icon is controlled to move toward the first mapping position. In addition, when a moving operation for the target object icon is obtained, a moving track of the target object icon toward the first mapping position is displayed on the operation interface.

According to a position relationship between the second display position and the release range of the target object attribute, that the terminal determines the first mapping position of the second display position in the moving range according to the second display position, the release range of the target object attribute, and the moving range of the target object icon includes but is not limited to the following two cases.

A first case: The second display position is located outside the release range of the target object attribute.

When the second display position of the mouse is located outside the release range of the target object attribute, the terminal cannot control the operation object to release the target object attribute. In this case, the terminal may determine a straight line according to the second display position of the mouse and a position of a center point of the release range of the target object attribute, calculate an intersection point of the straight line and the release range of the target object attribute, and further use the intersection point as the first mapping position.

Coordinates of the second display position of the mouse are set to (x, y), the shape of the release range is set to an ellipse, a length of a major axis of the ellipse is set to a, and a length of a minor axis of the ellipse is set to b, that is, an ellipse equation is $x^2/a^2+y^2/b^2=1$, and coordinates of a center point of the ellipse are set to (0, 0), so that a straight line equation determined according to the coordinates (x, y) of the second display position of the mouse and the coordinates (0, 0) of the center point of the ellipse is $y=kx$, and coordinates of an intersection point of the straight line and the ellipse can be calculated according to the straight line equation $y=kx$ and the ellipse equation $x^2/a^2+y^2/b^2=1$, to use the coordinates of the intersection point as the first mapping position.

The foregoing process may further be implemented by using the following code:

```
if (x²/a²+y²/b²>1)
{
    double k=y*1.0/x;
    x=(x<0? -1.0:1.0)/sqrt(1/ a²+k²/b²);
    y=k*x;
}
```

A second case: The second display position is located inside the release range of the target object attribute.

When the second display position of the mouse is located inside the release range of the target object attribute, because release ranges of different target object attributes are different, the terminal may scale the display position of the mouse according to the release range of the target object attribute, to obtain a scaled position, and determine the first mapping position according to the scaled position and the moving range of the target object icon.

Coordinates of the second display position of the mouse are set to (x, y), the shape of the release range is set to an ellipse, a length of a major axis of the ellipse is set to a, and a length of a minor axis of the ellipse is set to b, that is, an ellipse equation is $x^2/a^2+y^2/b^2=1$, a shape of the moving range of the target object icon is set to a circle, and a radius of the moving range is set to r, so that the terminal may scale a coordinate x of a horizontal axis of the mouse according to the length of the major axis of the ellipse, an obtained scaled coordinate of the horizontal axis being x'=x/a; and scale a coordinate y of a vertical axis of the mouse according to the length of the minor axis of the ellipse, an obtained scaled coordinate of the vertical axis being y'=y/b. That is, coordinates of the position after the scaling is (x/a, y/b). Coordinates (rx/a, ry/b) of the first mapping position may be obtained by multiplying the coordinates of the position after the scaling by the radius r of the moving range of the target object icon.

In the method provided in this embodiment of the present application, a position of the mouse on the operation interface is mapped to the moving range. This ensures that a direction to which a cursor of the mouse points is an actual display direction of the target object attribute when the user uses the mouse to control the operation object.

In an actual operation process, to enable the target object attribute to be accurately released to an area in which the user expects to release, the user may constantly adjust the second display position of the mouse. In this case, after the terminal obtains the second display position of the mouse on the operation interface and before the terminal controls the operation object to release the target object attribute, the terminal may further obtain a moving operation for the mouse in real time. If the terminal does not obtain the moving operation for the mouse, in response to the release operation for the operation object, the terminal may control the operation object to release the target object attribute in the specified area, and display the releaser of the target object attribute in the specified area; or if the terminal obtains the moving operation for the mouse, the terminal obtains a third display position of the mouse, and in response to the release operation, the terminal adjusts the specified area according to the first display position and the third display position, to obtain an adjusted area, and the terminal displays the releaser of the target object attribute in the adjusted area in response to the release operation for the operation object.

In another embodiment of this application, in response to the moving operation for the mouse, the terminal obtains the third display position of the mouse. When obtaining the release instruction for the target object attribute, the terminal determines a second mapping position of the third display position in the moving range according to the third display position, the release range, and the moving range. Further, when controlling the operation object to release the target object attribute in the specified area, the terminal controls the target object icon to move toward the second mapping position, and in response to the moving operation for the target object icon, the terminal displays a moving track of the target object icon toward the second mapping position on the operation interface. In a process of updating the display position of the mouse, to enable the processor of the terminal to identify the moving operation for the target object icon, after controlling the target object icon to move toward the second mapping position, the terminal may wait for second preset duration, and re-perform the updating operation on the second mapping position when the second preset duration is reached. The second preset duration is determined by the response capability of the processor, and the second preset duration may be 10 milliseconds, 20 milliseconds, or the like.

It should be noted that for a gaming application, the process of controlling the operation object to release the target object attribute in the specified area is actually a skill release process.

For the process in which the operation object is controlled to release the object attribute, for ease of understanding, FIG. 3 is used as an example for description below.

Figure 4:
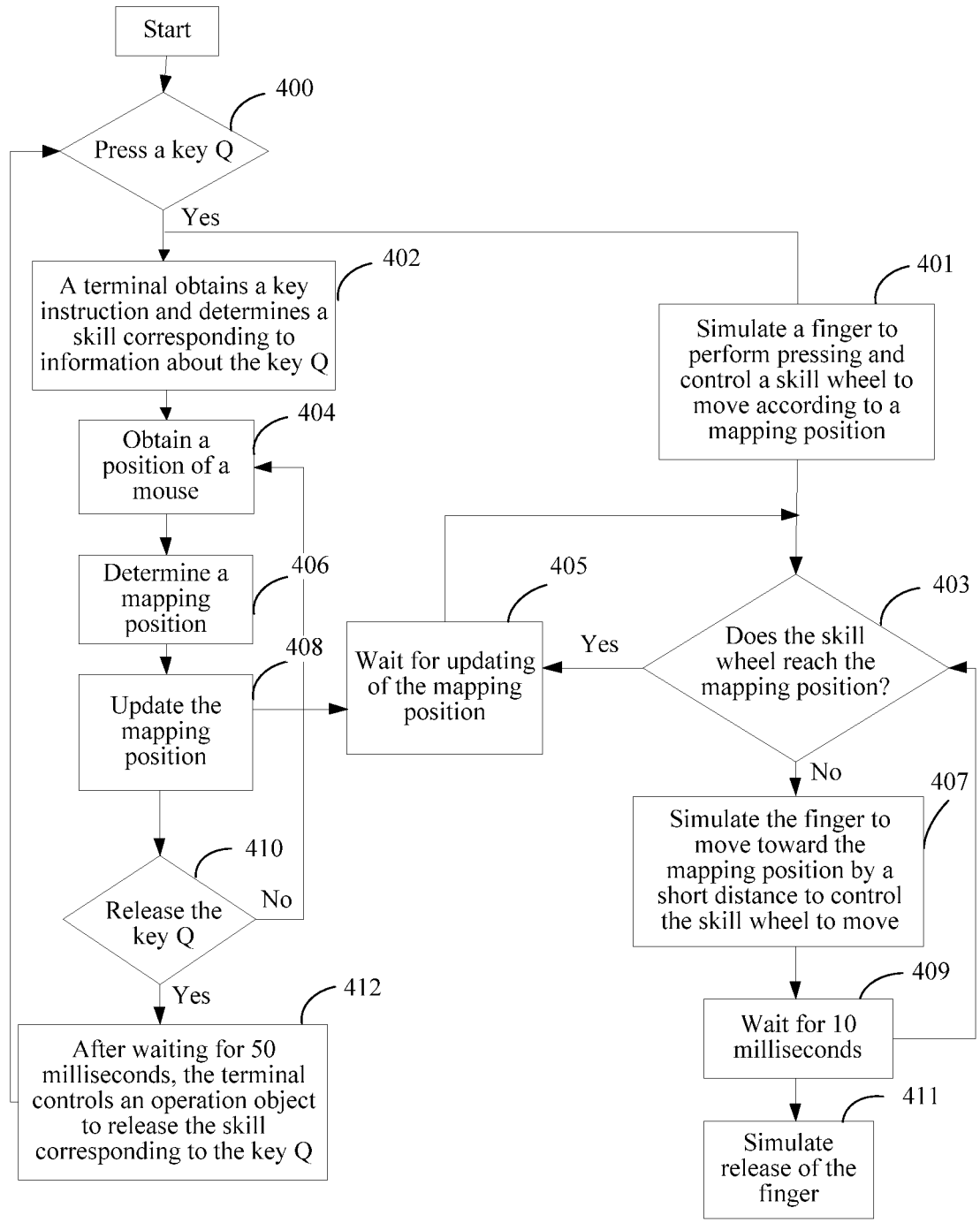
FIG. 4 is a schematic diagram of an operation control process according to another embodiment of this application.

Referring to FIG. 4, the specific application is set to a gaming application, and a skill that needs to be released is set to a skill corresponding to a key Q. Step 400: Determine whether the key Q is pressed. Step 402: A terminal obtains a key instruction in response to a triggering operation for the key Q on a corresponding keyboard, the key instruction including information about the key Q, and determines a skill corresponding to the information about the key Q. Step 404: The terminal obtains a position of a mouse. Step 406: Determine a mapping position according to the display position of the mouse, a skill range of the skill corresponding to the key Q, and a moving range of a skill wheel corresponding to the key Q. Step 408: Detect whether the position of the mouse changes, and update the mapping position according to an updated position of the mouse if the display position of the mouse changes. Step 410: Determine whether the key Q is released, and perform step 412 if the key Q is released, or return to step 404 if the key Q is not released. Step 412: The terminal controls an operation object to release the skill corresponding to the key Q in response to a release operation for the key Q. After step 400 is performed, that is, after the triggering operation for the key Q on the corresponding keyboard is obtained, step 401 may further be performed: The terminal further simulates an operation that a finger presses the skill wheel corresponding to the key Q on an operation interface, and controls the skill wheel to move according to the mapping position. Step 403: In the process of controlling movement of the skill wheel, determine whether the skill wheel reaches the mapping position, and perform step 405 if the skill wheel reaches the mapping position, or perform step 407 if the skill wheel does not reach the mapping position. Step 405: Wait for updating of the mapping position. Step 407: Simulate the finger to move toward the mapping position by a short distance to continue to control the skill wheel to move. Step 409: After 10 milliseconds, return to step 403 to perform the foregoing determining process until the release operation for the key Q is obtained, and perform step 411: Simulate release of the finger. After obtaining the release operation for the key Q, the terminal stops controlling the skill wheel to move, so that the skill wheel restores to an initial position.

Hereto, a process of displaying the target object attribute of the operation object is completed by using steps 201 to 206. For a process of moving the operation object, reference may be made to the following steps a to d.

a: In a running process of a specific application, a terminal obtains a clicking instruction in response to a clicking operation for a mouse.

The clicking instruction includes a clicking position.

Figure 5:
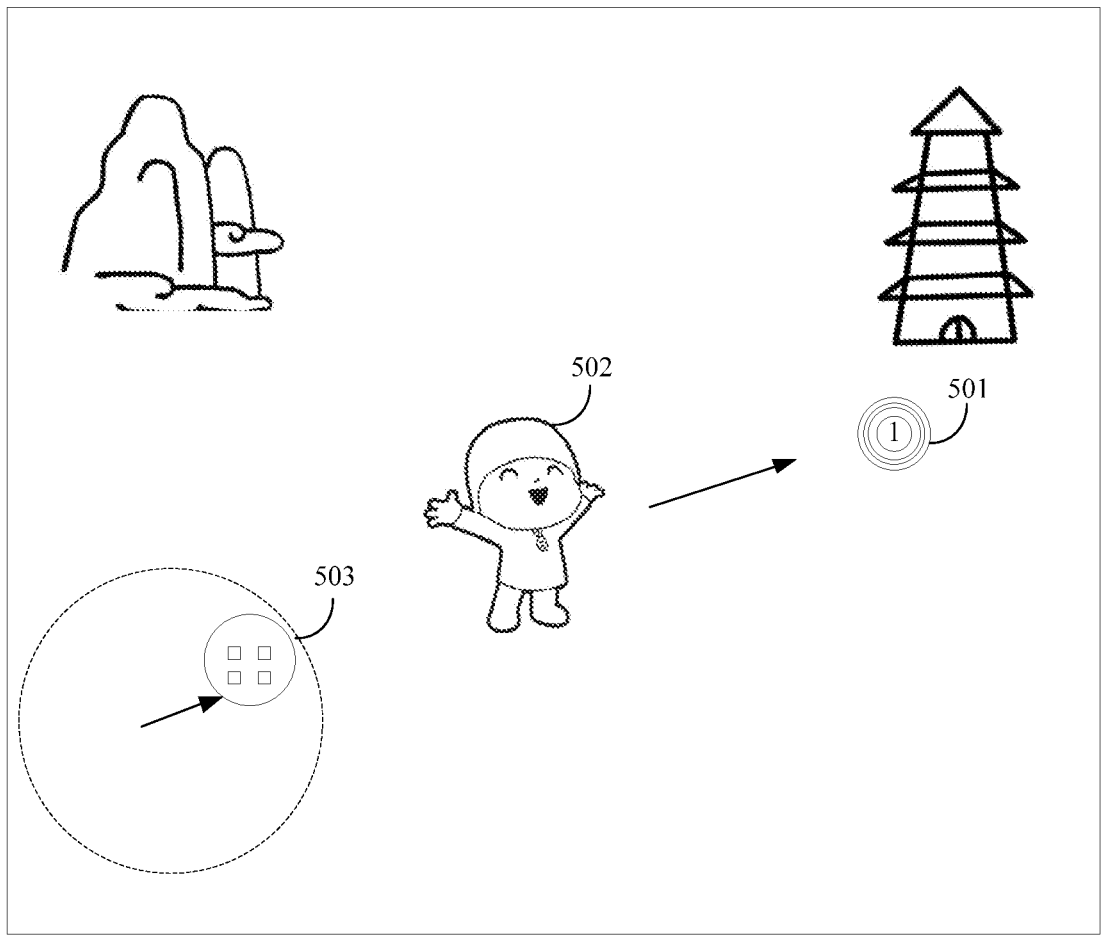
FIG. 5 is a schematic diagram of an operation interface according to another embodiment of this application.

After obtaining the clicking instruction, the terminal displays the clicking position of the mouse on an operation interface in a preset manner, to intuitively display the clicking position of the mouse to the user. The preset manner may be a ripple response manner or the like. Referring to FIG. 5, a position 501 of 1 in FIG. 5 is a clicking position of the mouse.

b: The terminal determines a moving direction and a moving distance of an operation object according to the clicking position and a first display position.

The terminal constructs a half-line by using the first display position of the operation object as a start point and the clicking position as an end point, and uses a direction of the half-line as the moving direction of the operation object. Because the direction of the half-line may be any direction, in the method provided in this embodiment of the present application, the moving direction of the operation object is expanded, and the operation object may be controlled to move in a 360-degree range.

The terminal obtains coordinates of the clicking position and coordinates of the first display position of the operation object, and calculates the moving distance of the operation object by using a formula of a distance between two points. The coordinates of the clicking position are set to $(x1, y1)$, and the coordinates of the first display position of the operation object are set to $(x2, y2)$, so that the moving distance of the operation object=squart$\{(x1-x2)^2+(y1-y2)^2\}$.

c: The terminal calculates moving duration of the operation object according to the moving distance.

In this embodiment of the present application, a moving speed of the operation object in the specific application is set to a fixed value, so that the terminal may calculate the moving duration of the operation object according to the moving distance and the moving speed of the operation object.

d: The terminal controls the operation object to move toward the clicking position according to the moving direction of the operation object and the moving duration of the operation object.

The terminal controls the operation object to move toward the clicking position according to the moving direction of the operation object. In the process of controlling movement of the operation object, the terminal determines whether the operation object reaches the clicking position according to the moving duration. If duration taken by the operation object to move toward the clicking position is shorter than the moving duration, it indicates that the operation object does not reach the clicking position, so that the terminal controls the operation object to continue to move toward the clicking position; and if duration taken by the operation object to move toward the clicking position is equal to the moving duration, it indicates that the operation object has reached the clicking position, so that the terminal controls the operation object to stop moving.

It should be noted that the coordinates of the clicking position and the coordinates of the first display position of the operation object obtained in the foregoing steps are coordinates on the current operation interface. However, in this application, the terminal needs to control the operation object to move toward the clicking position according to coordinates of the coordinates of the clicking position and the coordinates of the display position of the operation object in a scene map of the specific application. It is generally very difficult to obtain the coordinates of the coordinates of the clicking position and the coordinates of the display position of the operation object in the scene map of the specific application. To control movement of the operation object, in this embodiment of the present application, movement of the operation object may be controlled according to the moving duration.

e: The terminal displays a moving track of the operation object on the operation interface in response to a moving operation for the operation object.

In another embodiment of this application, when controlling the operation object to move toward the clicking position, the terminal further controls a moving icon to move according to the moving track of the operation object, and displays a moving track of the moving icon on the operation interface in response to a moving operation for the moving icon. The moving icon is an icon that controls the operation object to move. Referring to FIG. 5, the specific application is a gaming application. In a process of controlling movement of an operation object 502, the terminal may control a moving icon 503 to move along an arrow direction according to a moving track of the operation object 502.

Figure 6:
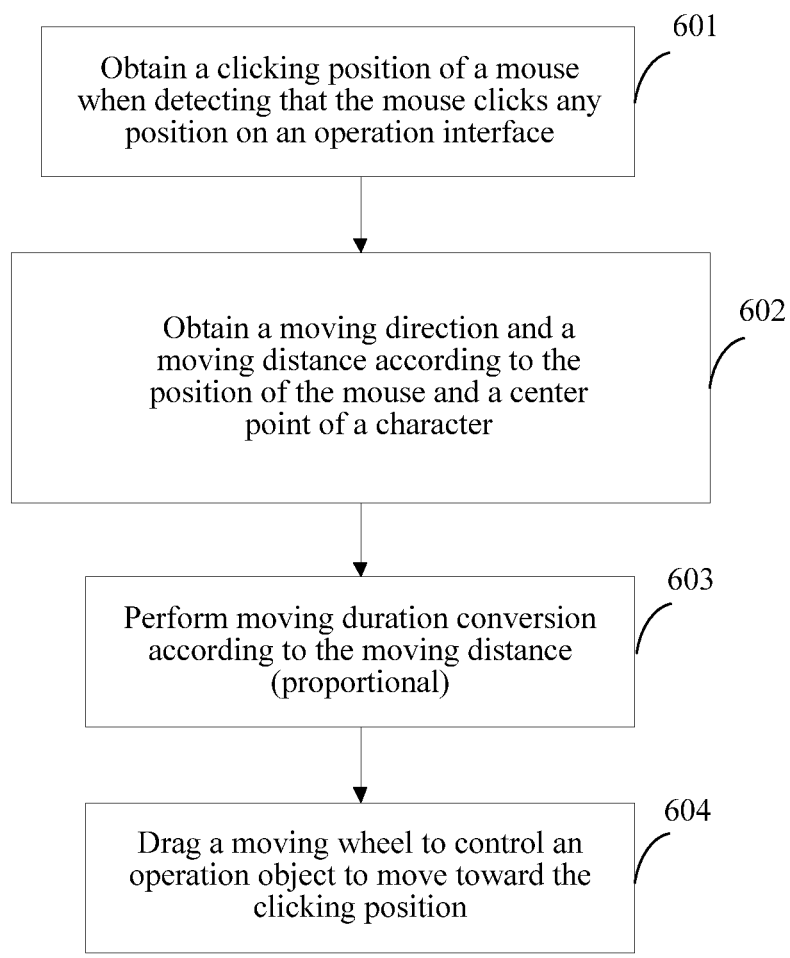
FIG. 6 is a schematic diagram of an operation control process according to another embodiment of this application.

For the foregoing process of movement control of the operation object, for ease of understanding, FIG. 6 is used as an example for description below.

Referring to FIG. 6, in a running process of the gaming application, the following steps are performed.

Step 601: Obtain a clicking position of a mouse when detecting that the mouse clicks any position on an operation interface.

Step 602: Determine a moving direction and a moving distance according to the clicking position of the mouse and a position of a center point of the operation object, the moving direction being a direction toward which a user expects the operation object to move, and the moving distance being a distance between the clicking position of the mouse and the position of the center point of the operation object.

Step 603: Perform moving duration conversion according to the moving distance (proportionally).

Step 604: Drag a moving wheel to control the operation object to move toward the clicking position.

For gaming applications installed in a terminal, some gaming applications relate to moving and release operations, and some gaming applications do not relate to the moving and release operations. Therefore, to save resources, after starting a specific application, the terminal further detects whether the specific application is an application that supports the operation control method provided in this application (in other words, whether the specific application supports a new operation manner). If the specific application supports the operation control method provided in this application, the user is guided to enable a corresponding control function, and if the specific application does not support the operation control method provided in this application, or the user does not enable a corresponding function, operation control is performed on the operation object in the specific application by using a conventional method.

Figure 7:
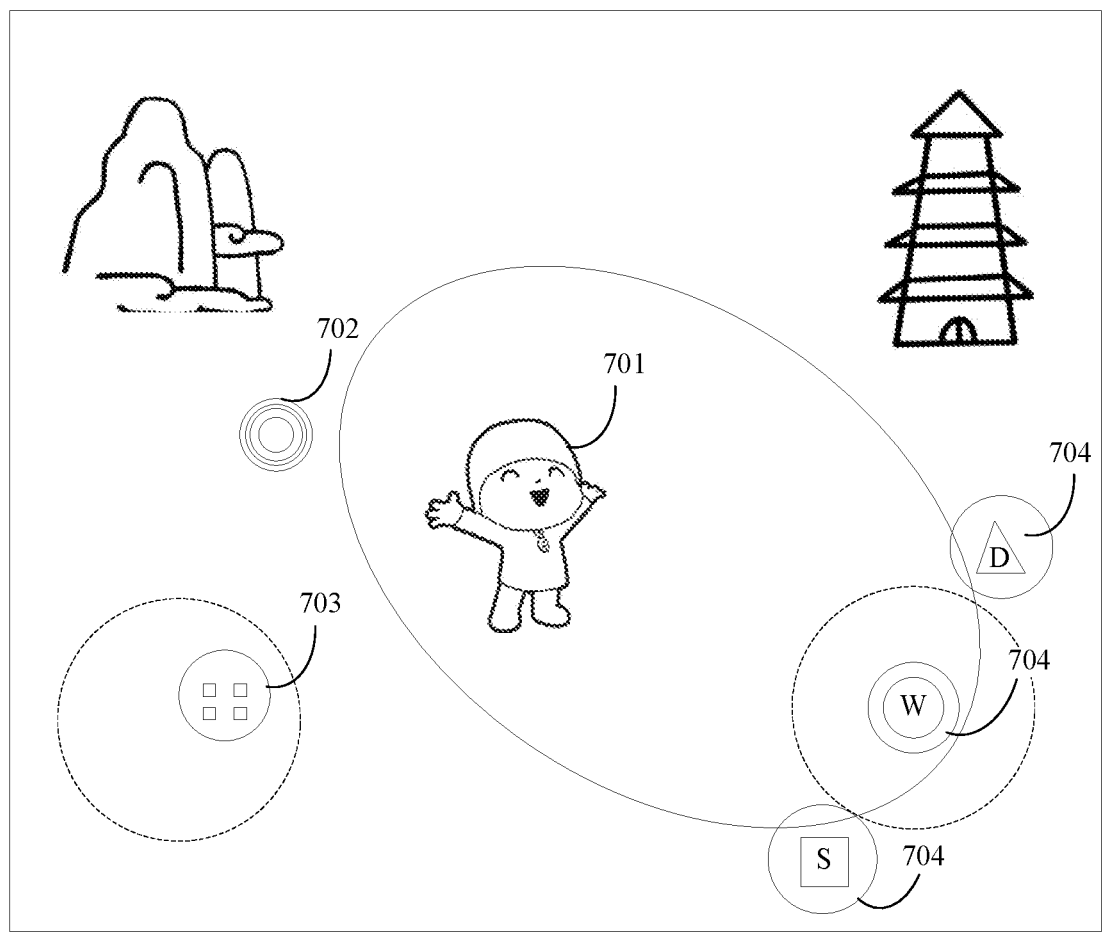
FIG. 7 is a schematic diagram of an operation interface according to another embodiment of this application.
Figure 8:
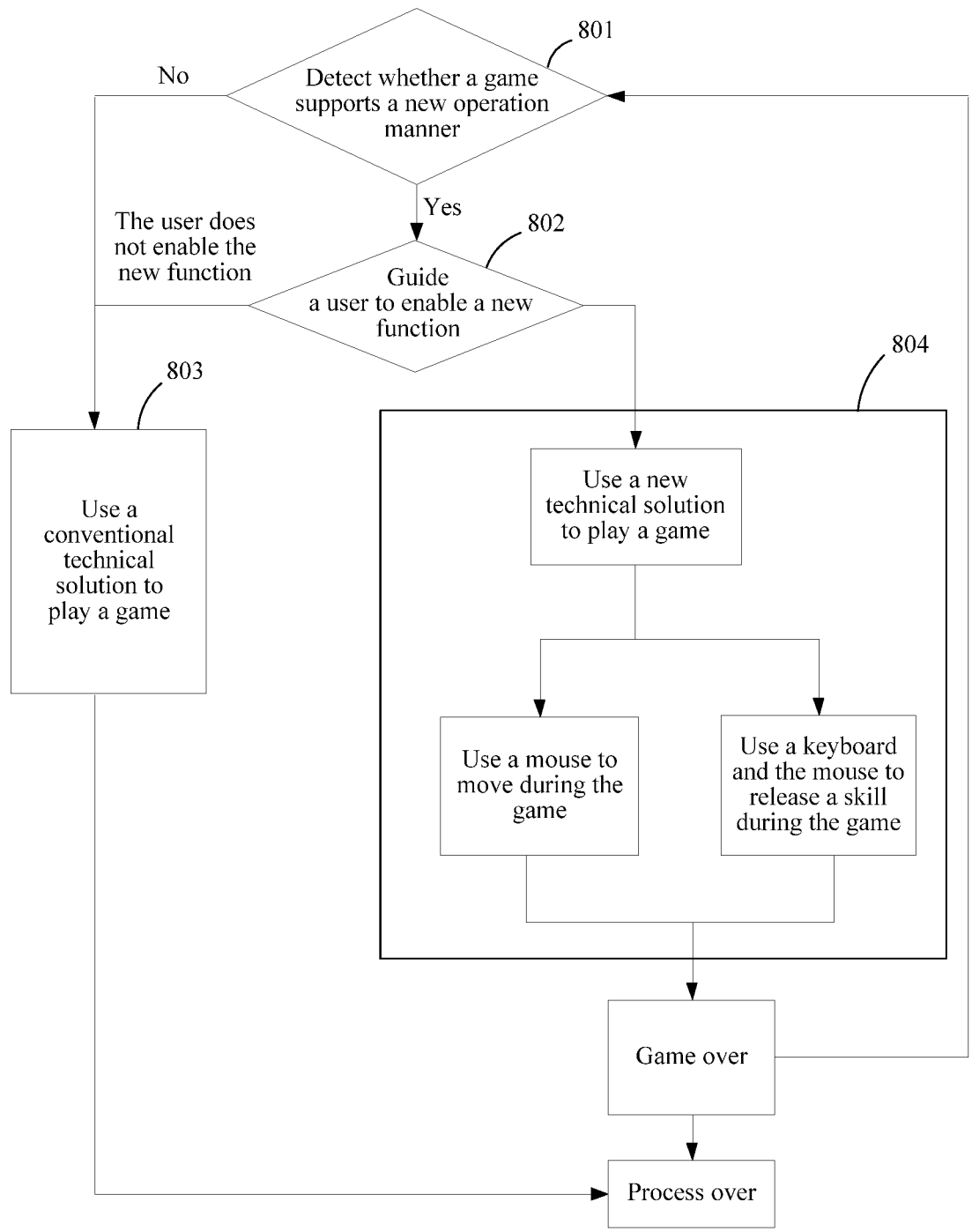
FIG. 8 is a schematic diagram of an operation control process according to another embodiment of this application.

For movement control and skill-release control performed on the operation object by using the method provided in this embodiment of the present application, FIG. 7 and FIG. 8 are used as an example for description below, including the following steps.

Referring to FIG. 8, step 801: After starting a gaming application, a terminal detects whether the gaming application supports a new operation manner, and if the gaming application supports the new operation manner, step 802 is performed, or if the gaming application does not support the new operation manner, or a user does not enable a new function, step 803 is performed. Step 802: Guide the user to enable the new function, and if the user enables the new function, step 804 is performed, or if the user does not enable the new function, step 803 is performed. Step 803: Perform operation control by using a conventional solution. Step 804: Use a new technical solution to play a game, including using movement of a mouse and using the mouse to release a skill in the game. Specifically, when controlling movement of an operation object in the game, the terminal may obtain a clicking position of the mouse based on the mouse, to control the operation object to move toward the clicking position of the mouse.

Referring to FIG. 7, in a process of controlling movement of an operation object 701, a clicking position 702 of a mouse is displayed, and a moving icon 703 is controlled to move according to a moving track of the operation object 701. When controlling skill release of the operation object in a game, a terminal may obtain, based on the mouse and a keyboard, a display position of the mouse and a skill corresponding to a triggered key on the keyboard, to control the operation object to release the skill when receiving a key release message. Referring to FIG. 7, when the operation object 701 is controlled to release the skill, a skill wheel 704 is controlled to move according to the position 702 of the mouse.

In the method provided in this embodiment of the present application, the target object attribute is determined according to an effective key message of the triggered key, to control the operation object to release the target object attribute in the specified area determined by the first display position and the second display position when the release operation for the specific key is obtained. In this process, a center point of the target object icon does not need to be clicked by using the mouse, and the target object icon also does not need to be dragged. This not only reduces operation complexity, but also improves release precision. In addition, in this application, movement of the operation object is controlled according to the clicking position of the mouse and the position of the operation object, thereby expanding the moving direction of the operation object.

Figure 9:
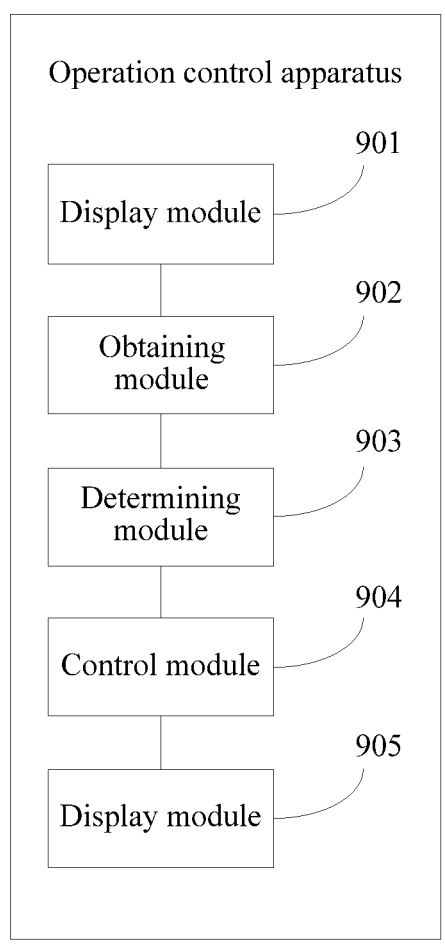
FIG. 9 is a schematic structural diagram of an operation control apparatus according to another embodiment of this application.

Referring to FIG. 9, an embodiment of the present application provides an operation control apparatus, including:

a display module 901, configured to display an operation interface of a specific application, a first display position of an operation object and a second display position of a corresponding mouse being displayed on the operation interface, and the operation object being an object managed by a user account for logging in to the specific application;

an obtaining module 902, configured to obtain a key instruction in response to a triggering operation for a specific key on a corresponding keyboard, the key instruction including effective key information, the obtaining module 902 being further configured to obtain a target object attribute from at least one object attribute of the operation object according to the effective key information, and the obtaining module 902 being further configured to obtain a release instruction for the target object in response to a release operation for the specific key;

a determining module 903, configured to determine a specified area according to the first display position and the second display position when the release operation is obtained;

a control module 904, configured to control the operation object to release the target object attribute in the specified area; and a display module 905, configured to display a releaser of the target object attribute in the specified area when a release operation for the operation object is obtained.

In another embodiment of this application, a release range of the target object attribute and a moving range of a target object icon are further displayed on the operation interface, and the target object icon is an icon that carries the target object attribute;

the determining module 903 is configured to determine a first mapping position of the second display position in the moving range according to the second display position, the release range, and the moving range when the release instruction is obtained;

the control module 904 is configured to control the target object icon to move toward the first mapping position when controlling the operation object to release the target object attribute in the specified area; and the display module 905 is configured to display a moving track of the target object icon toward the first mapping position on the operation interface when a moving operation for the target object icon is obtained.

In another embodiment of this application, the determining module 903 is configured to determine a straight line according to the second display position and a position of a center point of the release range if the second display position is located outside the release range; and calculate an intersection point of the straight line and the release range, and use the intersection point as the first mapping position; or the determining module 903 is configured to scale the second display position according to the release range if the second display position is located inside the release range, to obtain a scaled position; and determine the first mapping position according to the scaled position and the moving range.

In another embodiment of this application, the obtaining module 902 is configured to obtain a third display position of the mouse in response to a moving operation for the mouse;

an adjustment module is configured to adjust the specified area according to the first display position and the third display position when the release instruction is obtained, to obtain an adjusted area;

the control module 904 is configured to control the operation object to release the target object attribute in the adjusted area; and the display module 905 is configured to display a releaser of the target object attribute in the adjusted area when a release operation for the operation object is obtained.

In another embodiment of this application, the obtaining module 902 is configured to obtain a third display position of the mouse in response to a moving operation for the mouse;

the determining module 903 is configured to determine a second mapping position of the third display position in the moving range according to the third display position, the release range, and the moving range when the release instruction is obtained;

the control module 904 is configured to control the target object icon to move toward the second mapping position when controlling the operation object to release the target object attribute in the specified area; and the display module 905 is configured to display a moving track of the target object icon toward the second mapping position on the operation interface when a moving operation for the target object icon is obtained.

In another embodiment of this application, the obtaining module 902 is configured to obtain a clicking instruction in response to a clicking operation for the mouse, the clicking instruction including a clicking position;

the display module 905 is configured to display the clicking position on the operation interface when the clicking instruction is obtained; and the determining module 903 is configured to determine a moving direction and a moving distance of the operation object according to the clicking position and the first display position;

a calculation module is configured to calculate moving duration of the operation object according to the moving distance;

the control module 904 is configured to control the operation object to move toward the clicking position according to the moving direction and the moving duration; and the display module 905 is configured to display a moving track of the operation object on the operation interface when a moving operation for the operation object is obtained.

In another embodiment of this application, the control module 904 is configured to control a moving icon to move according to the moving track of the operation object when controlling the operation object to move toward the clicking position, the moving icon being an icon that controls the operation object to move; and the display module 905 is configured to display a moving track of the moving icon on the operation interface when a moving operation for the moving icon is obtained.

In conclusion, in the apparatus provided in this embodiment of the present application, the target object attribute is determined according to an effective key message of a triggered key, to control the operation object to release the target object attribute in the specified area determined by the first display position and the second display position when the release operation for the specific key is obtained. In this process, a center point of the target object icon does not need to be clicked by using the mouse, and the target object icon also does not need to be dragged. This not only reduces operation complexity, but also improves release precision. In addition, in this application, movement of the operation object is controlled according to the clicking position of the mouse and the position of the operation object, thereby expanding the moving direction of the operation object.

Figure 10:
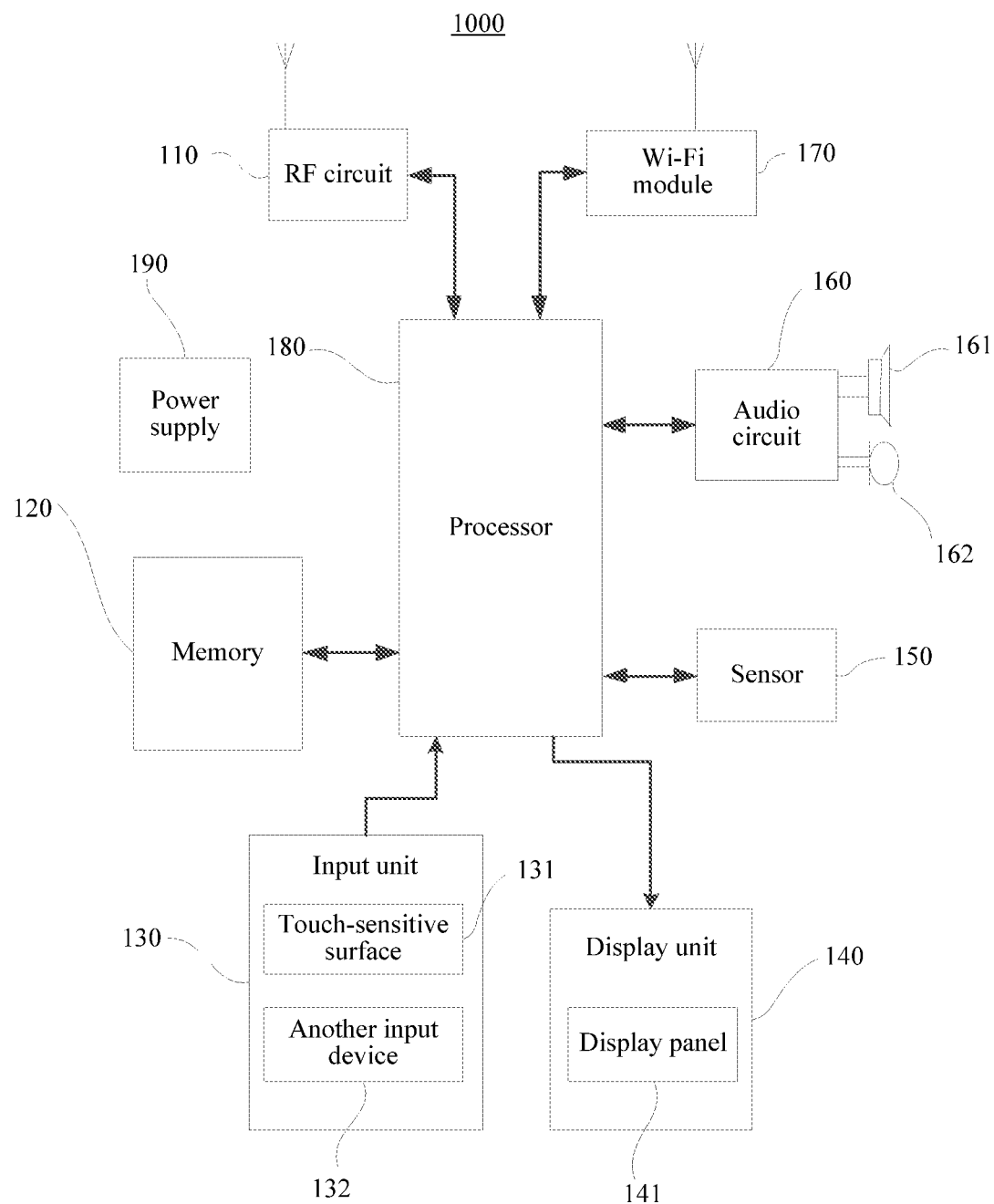
FIG. 10 is a schematic structural diagram of an operation control terminal according to an embodiment of this application.

FIG. 10 is a schematic structural diagram of an operation control terminal according to an embodiment of the present application. The terminal may be configured to implement the operation control method provided in the foregoing embodiment. Specifically:

The terminal 1000 may include components such as a radio frequency (RF) circuit 110, a memory 120 including one or more computer readable storage mediums, an input unit 130, a display unit 140, a sensor 150, an audio circuit 160, a wireless fidelity (Wi-Fi) module 170, a processor 180 including one or more processing cores, and a power supply 190. A person skilled in the art may understand that the structure of the terminal shown in FIG. 10 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Usually, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device through wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 1000, and the like. In addition, the memory 120 may include a high-speed random access memory, and may further include a non-volatile memory such as at least one magnetic disk storage device or a flash memory device, or another volatile solid storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface 131. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1000. These graphical user interfaces may include a graph, text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of the touch event. Then, the processor 180 provides a corresponding visual output on the display panel 141 according to the type of the touch event. Although, in FIG. 10, the touch-sensitive surface 131 and the display panel 141 are used as two separate parts to implement input and output functions, but in some embodiments, the touch-sensitive surface 131 and the display panel 141 may be integrated to implement the input and output functions.

The terminal 1000 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1000 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of a mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1000, are not further described herein.

The audio circuit 160, a speaker 161, and a microphone 162 may provide audio interfaces between the user and the terminal 1000. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 1000.

Wi-Fi belongs to a short distance wireless transmission technology. The terminal 1000 may help, by using the Wi-Fi module 170, a user to receive and send an email, browse a web page, access stream media, and the like. This provides wireless broadband Internet access for the user. Although FIG. 10 shows the Wi-Fi module 170, it may be understood that the Wi-Fi module 170 is not a necessary component of the terminal 1000, and the Wi-Fi module 170 may be omitted as required provided that the scope of the essence of the present disclosure is not changed.

The processor 180 is a control center of the terminal 1000, which is connected to various parts of the entire mobile phone by using various interfaces and lines, and by running or executing a software program and/or module stored in the memory 120 and calling data stored in the memory 120, to perform various functions of the terminal 1000 and process data, so as to perform overall monitoring on the mobile phone. Optionally, the processor 180 may include one or more processing cores. Optionally, the processor 180 may integrate an application processor and a modem processor, where the application processor mainly processes an operating system, a user interface, an application program, and the like, and the modem processor mainly processes wireless communication. It may be understood that the foregoing modem processor may alternatively not be integrated into the processor 180.

The terminal 1000 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other component.

Although not shown in the figure, the terminal 1000 may further include a camera, a Bluetooth module, and the like, which are not further described herein. Specifically, in this embodiment, the display unit of the terminal 1000 is a touchscreen display, and the terminal 1000 further includes a memory and one or more programs, where the one or more programs are stored in the memory, and are configured to be executed by one or more processors. The one or more programs include an instruction used for performing the operation control method.

In the terminal provided in this embodiment of the present application, a target object attribute is determined according to an effective key message of a triggered key, to control an operation object to release the target object attribute in a specified area determined by a first display position and a second display position when a release operation for a specific key is obtained. In this process, a center point of a target object icon does not need to be clicked by using a mouse, and the target object icon also does not need to be dragged. This not only reduces operation complexity, but also improves release precision. In addition, in this application, movement of the operation object is controlled according to a clicking position of the mouse and a position of the operation object, thereby expanding a moving direction of the operation object.

An embodiment of the present application further provides a computer readable storage medium, where the computer readable storage medium may be a computer readable storage medium included in the memory in the foregoing embodiment; or may be a computer readable storage medium that exists alone and that is not assembled in the terminal. The computer readable storage medium stores one or more programs, and the one or more programs are executed by one or more processors to perform an operation control method.

In the computer readable storage medium provided in this embodiment of the present application, a target object attribute is determined according to an effective key message of a triggered key, to control an operation object to release the target object attribute in a specified area determined by a first display position and a second display position when a release operation for a specific key is obtained. In this process, a center point of a target object icon does not need to be clicked by using a mouse, and the target object icon also does not need to be dragged. This not only reduces operation complexity, but also improves release precision. In addition, in this application, movement of the operation object is controlled according to a clicking position of the mouse and a position of the operation object, thereby expanding a moving direction of the operation object.

An embodiment of the present application provides a graphical user interface. The graphical user interface is used in a terminal in the operation control method. The terminal that performs the operation control method includes a touchscreen display, a memory, and one or more processors configured to execute one or more programs.

In the graphical user interface provided in this embodiment of the present application, a target object attribute is determined according to an effective key message of a triggered key, to control an operation object to release the target object attribute in a specified area determined by a first display position and a second display position when a release operation for a specific key is obtained. In this process, a center point of a target object icon does not need to be clicked by using a mouse, and the target object icon also does not need to be dragged. This not only reduces operation complexity, but also improves release precision. In addition, in this application, movement of the operation object is controlled according to a clicking position of the mouse and a position of the operation object, thereby expanding a moving direction of the operation object.

It should be noted that, when the operation control apparatus provided in the foregoing embodiment performs operation control, only divisions of the foregoing functional modules are described by using an example. During actual application, the foregoing functions may be allocated to and completed by different functional modules according to requirements, that is, an internal structure of the operation control apparatus is divided into different functional modules, to complete all or some of the foregoing described functions. In addition, the operation control apparatus and operation control method embodiments provided in the foregoing embodiments belong to one conception. For the specific implementation process, refer to the method embodiments, and details are not described herein again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An operation control method performed at a terminal having one or more processors and memory storing a plurality of programs to be executed by the one or more processors, the method comprising:

displaying an operation interface of a specific application, a first display position of an operation object and a second display position of a corresponding mouse being displayed on the operation interface;

obtaining a key instruction in response to a triggering operation for a specific key on a corresponding keyboard, the key instruction comprising effective key information;

obtaining a target object attribute from object attributes of the operation object according to the effective key information;

obtaining a release instruction for the target object in response to a release operation for the specific key;

determining a first specified area according to the first display position and the second display position; and controlling the operation object to release the target object attribute in the first specified area.

2. The method according to claim 1, wherein the controlling the operation object to release the target object attribute in the first specified area further comprises:
   displaying a releaser of the target object attribute in the first specified area in response to a release operation for the operation object.

3. The method according to claim 2, wherein a release range of the target object attribute and a moving range of a target object icon are further displayed on the operation interface, and the target object icon is an icon that carries the target object attribute; and
   the method further comprises:
      determining a first mapping position of the second display position in the moving range according to the second display position, the release range, and the moving range in response to the release instruction;
      controlling the target object icon to move toward the first mapping position when controlling the operation object to release the target object attribute in the first specified area; and
      displaying a moving track of the target object icon toward the first mapping position on the operation interface in response to a moving operation for the target object icon.

4. The method according to claim 3, wherein the determining a first mapping position of the second display position in the moving range according to the second display position, the release range, and the moving range comprises:
   determining a straight line according to the second display position and a position of a center point of the release range when the second display position is located outside the release range; and
   calculating an intersection point of the straight line and the release range, and using the intersection point as the first mapping position.

5. The method according to claim 3, wherein the determining a first mapping position of the second display position in the moving range according to the second display position, the release range, and the moving range comprises:
   scaling the second display position according to the release range when the second display position is located inside the release range, to obtain a scaled position; and
   determining the first mapping position according to the scaled position and the moving range.

6. The method according to claim 3, the method further comprising:
   obtaining a third display position of the mouse in response to a moving operation for the mouse;
   determining a second mapping position of the third display position in the moving range according to the third display position, the release range, and the moving range in response to the release instruction;
   controlling the target object icon to move toward the second mapping position when controlling the operation object to release the target object attribute in the second specified area; and
   displaying a moving track of the target object icon toward the second mapping position on the operation interface in response to a moving operation for the target object icon.

7. The method according to claim 1, the method further comprising:
   obtaining a third display position of the mouse in response to a moving operation for the mouse;
   adjusting the first specified area according to the first display position and the third display position in response to the release instruction, to obtain a second specified area;
   controlling the operation object to release the target object attribute in the second specified area; and
   displaying a releaser of the target object attribute in the adjusted area when obtaining a release operation for the operation object.

8. The method according to claim 1, the method further comprising:
   obtaining a clicking instruction in response to a clicking operation for the mouse, the clicking instruction comprising a clicking position;
   displaying the clicking position on the operation interface in response to the clicking instruction;
   determining a moving direction and a moving distance of the operation object according to the clicking position and the first display position;
   calculating moving duration of the operation object according to the moving distance;
   controlling the operation object to move toward the clicking position according to the moving direction and the moving duration; and
   displaying a moving track of the operation object on the operation interface in response to a moving operation for the operation object.

9. The method according to claim 8, the method further comprising:
   when controlling the operation object to move toward the clicking position, controlling a moving icon to move according to the moving track of the operation object, the moving icon being an icon that controls the operation object to move; and
   displaying a moving track of the moving icon on the operation interface in response to a moving operation for the moving icon.

10. A terminal, comprising memory and a processor, the memory storing computer readable instructions that, when executed by the processor, cause the terminal to perform a plurality of operations including:
   displaying an operation interface of a specific application, a first display position of an operation object and a second display position of a corresponding mouse being displayed on the operation interface;
   obtaining a key instruction in response to a triggering operation for a specific key on a corresponding keyboard, the key instruction comprising effective key information;
   obtaining a target object attribute from object attributes of the operation object according to the effective key information;
   obtaining a release instruction for the target object attribute in response to a release operation for the specific key;
   determining a first specified area according to the first display position and the second display position; and
   controlling the operation object to release the target object attribute in the first specified area.

11. The terminal according to claim 10, wherein the controlling the operation object to release the target object attribute in the first specified area further comprises:
   displaying a releaser of the target object attribute in the first specified area in response to a release operation for the operation object.

12. The terminal according to claim 11, wherein a release range of the target object attribute and a moving range of a target object icon are further displayed on the operation interface, and the target object icon is an icon that carries the target object attribute; and the plurality of operations further comprises:

determining a first mapping position of the second display position in the moving range according to the second display position, the release range, and the moving range in response to the release instruction;

controlling the target object icon to move toward the first mapping position when controlling the operation object to release the target object attribute in the first specified area; and displaying a moving track of the target object icon toward the first mapping position on the operation interface in response to a moving operation for the target object icon.

13. The terminal according to claim 12, wherein the determining a first mapping position of the second display position in the moving range according to the second display position, the release range, and the moving range comprises:

determining a straight line according to the second display position and a position of a center point of the release range when the second display position is located outside the release range; and calculating an intersection point of the straight line and the release range, and using the intersection point as the first mapping position.

14. The terminal according to claim 12, wherein the determining a first mapping position of the second display position in the moving range according to the second display position, the release range, and the moving range comprises:

scaling the second display position according to the release range when the second display position is located inside the release range, to obtain a scaled position; and determining the first mapping position according to the scaled position and the moving range.

15. The terminal according to claim 12, wherein the plurality of operations further comprise:

obtaining a third display position of the mouse in response to a moving operation for the mouse;

determining a second mapping position of the third display position in the moving range according to the third display position, the release range, and the moving range in response to the release instruction;

controlling the target object icon to move toward the second mapping position when controlling the operation object to release the target object attribute in the second specified area; and displaying a moving track of the target object icon toward the second mapping position on the operation interface in response to a moving operation for the target object icon.

16. The terminal according to claim 10, wherein the plurality of operations further comprise:

obtaining a third display position of the mouse in response to a moving operation for the mouse;

adjusting the first specified area according to the first display position and the third display position in response to the release instruction, to obtain a second specified area;

controlling the operation object to release the target object attribute in the second specified area; and displaying a releaser of the target object attribute in the adjusted area when obtaining a release operation for the operation object.

17. The terminal according to claim 10, wherein the plurality of operations further comprise:

obtaining a clicking instruction in response to a clicking operation for the mouse, the clicking instruction comprising a clicking position;

displaying the clicking position on the operation interface in response to the clicking instruction;

determining a moving direction and a moving distance of the operation object according to the clicking position and the first display position;

calculating moving duration of the operation object according to the moving distance;

controlling the operation object to move toward the clicking position according to the moving direction and the moving duration; and displaying a moving track of the operation object on the operation interface in response to a moving operation for the operation object.

18. The terminal according to claim 17, wherein the plurality of operations further comprise:

when controlling the operation object to move toward the clicking position, controlling a moving icon to move according to the moving track of the operation object, the moving icon being an icon that controls the operation object to move; and displaying a moving track of the moving icon on the operation interface in response to a moving operation for the moving icon.

19. A non-transitory computer readable storage medium storing a plurality of machine readable instructions in connection with a terminal having one or more processors, wherein the plurality of machine readable instructions, when executed by the one or more processors, cause the terminal to perform a plurality of operations including:

displaying an operation interface of a specific application, a first display position of an operation object and a second display position of a corresponding mouse being displayed on the operation interface;

obtaining a key instruction in response to a triggering operation for a specific key on a corresponding keyboard, the key instruction comprising effective key information;

obtaining a target object attribute from object attributes of the operation object according to the effective key information;

obtaining a release instruction for the target object attribute in response to a release operation for the specific key;

determining a first specified area according to the first display position and the second display position; and controlling the operation object to release the target object attribute in the first specified area.

20. The non-transitory computer readable storage medium according to claim 19, wherein the controlling the operation object to release the target object attribute in the first specified area further comprises:

displaying a releaser of the target object attribute in the first specified area in response to a release operation for the operation object.

\* \* \* \* \*